United States Patent [19]

Theoleyre et al.

[11] Patent Number: 4,837,660

[45] Date of Patent: Jun. 6, 1989

[54] SELF-PROTECTED LOW VOLTAGE CAPACITOR

[75] Inventors: Serge Theoleyre, Aix-les-Bains; Pascal Salsetti, Voiron; Daniel Masset, Veyrier-du-Lac, all of France

[73] Assignee: Merlin Gerin, France

[21] Appl. No.: 196,068

[22] Filed: May 17, 1988

[51] Int. Cl.[4] .............................................. H01G 4/40
[52] U.S. Cl. ................................................... 361/275
[58] Field of Search .............. 361/15, 272, 275, 433 H

[56] References Cited

U.S. PATENT DOCUMENTS 3,473,088 10/1969 Ernst ..................................... 361/15
4,577,257 3/1986 Erhardt et al. ...................... 361/272

FOREIGN PATENT DOCUMENTS 736175 7/1969 Belgium .
2436443 2/1976 Fed. Rep. of Germany ...... 361/275
3231864 3/1984 Fed. Rep. of Germany .
1214833 11/1959 France .
2492577 4/1982 France .

*Primary Examiner*—Donald A. Griffin
*Attorney, Agent, or Firm*—Arnold, White & Durkee

[57] ABSTRACT

Low voltage power capacitor of the self-healing type, wherein each capacitor cell is fitted with individual protection, enabling the cell to be disconnected in all cases of faults which are liable to occur. The cell coil is electrically connected in series to a fuse housed in a chamber arranged in the sealing cover of the casing housing the coil. Protection against overpressures inside the casing is provided by a membrane, deformation of which actuates a short-circuiting contact. The clean short-circuit, generated by closing of the short-circuiting contact, causes the fuse to blow and the faulty cell to be disconnected.

8 Claims, 3 Drawing Sheets

SELF-PROTECTED LOW VOLTAGE CAPACITOR

BACKGROUND OF THE INVENTION

The invention relates to a power capacitor cell, with a metallized film, essentially used for correcting the power factor in low voltage. The capacitor is called self-healing, for the presence of minor faults in the dielectric film results in a localized puncture, leading to evaporation of the electrodes in the vicinity of the fault without damaging the adjacent film. A capacitor cell is achieved by winding metallized plastic films and the capacitor consists of an assembly of wound cells, connected according to a parallel series arrangement, depending on the power. When abnormal stresses occur, notably overvoltages or temperature rises, a dielectric breakdown may damage the self-healing properties of the capacitor. The resulting increase of the current flowing through the cell causes the temperature to rise in the vicinity of the fault and decomposition gases of the plastic film to be produced. The effect of the pressure may cause the casing to explode. A conventional protective device consists in placing the cell components in a metal box sufficiently solid to contain the gases emitted. The fault is cleared from the circuit after the cell affected by the fault has been completely destroyed, but there remains a high internal short-circuit risk and a risk of explosion. Another state-ofthe-art solution consists in providing each capacitor cell with an electrical fuse which interrupts the circuit and disconnects the faulty cell when an overcurrent occurs. This protection is ineffective when the fault is impedant, therefore when the short-circuit current is limited.

The pressure increase causes deformation of the casing and it has already been proposed to fit a cover which can be deformed or ejected by the effect of the pressure, this deformation or ejection tearing a cell connecting wire off so as to disconnect it. This protection is effective for small overcurrents, but has the drawback of restriking when disconnection takes place with high short-circuit currents. Such a restriking causes the casing to open or to explode with a risk of fire or at least a large amount of fumes given off damaging the neighbouring equipment. An alternative described in this document consists in cutting the insulation of a connecting wire to create a short-circuit, but the operation is not reliable.

SUMMARY OF THE INVENTION

The object of the invention is to achieve a self-healing capacitor, equipped with effective protection in the event of deterioration of the self-healing property.

The overpressure in the casing generates a clean short-circuit which is cleared by the fuse associated with the cell and incorporated in the casing or in the cover closing the cell casing.

The short-circuiting contact may be a simple flexible blade whose free end is held by a retaining stop. When the blade is released, for example by clearing the stop or by deformation of the blade by a deformable part of the casing, the blade moves at high speed to the closed position of the short-circuiting contact. The deformable part of the casing is, according to a preferred embodiment of the invention, a membrane sealing one of the ends of the casing and fitted between the casing and a cap forming a cover. The casing, membrane, and cap are advantageously of plastic material and their leaktight assembly is achieved by casting a polymerizable material.

The fuse, fitted in series with the cell, is incorporated in the cover and its characteristics are naturally suited to the use of the power capacitor. The fuse must notably continuously withstand the rated current and in addition the transient making currents. It must also have a sufficiently short response time to interrupt the short-circuit current, due to closing of the short-circuiting contact, before the casing is ruptured due to the pressure. It is important to provide a gap between the internal wall of the casing and the coated wound cell for the gases to escape to the membrane to cause deformation of the latter before any risk of explosion of the casing due to the effect of local overpressure. Combined protection by an electrical fuse and a deformable membrane actuating a shortcircuiter ensures efficient disconnection of the cell on any type of fault liable to occur in a self-healing capacitor. Perfect self-protection of each cell avoids using high mechanical performance metal casings.

According to a development of the invention, the cover has a square cross-section in which the circular cross-section of the casing is inscribed, the edges of the cover having fixing means, notably for clipping onto adjoining covers. This modular system enables capacitors with any number of cells to be achieved without using special frames or connecting systems.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
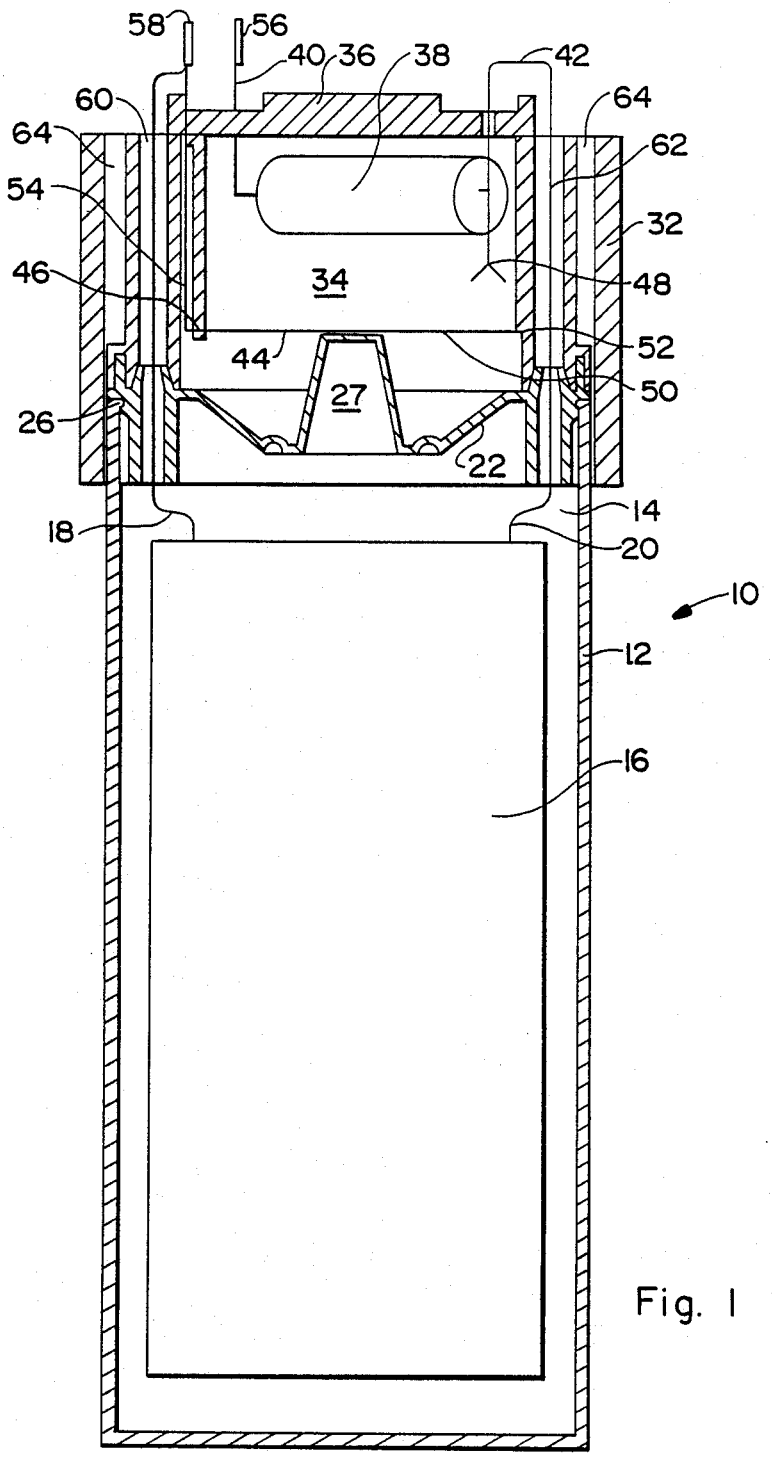
FIG. 1 is a schematic axial section view of a capacitor cell according to the invention in normal operating position.

In the figures, a capacitor cell 10 comprises a cylindrical casing 12, notably of plastic material, one 14 of the ends of which is open. Inside the case 12 there is housed a coil 16 formed by a winding of metallized plastic films. The coil is coated in a resin in the usual way and has two connecting wires 18, 20, on the face of the side of the open end 14 of the casing 12. The coil 16 is of the self-healing type when a localized puncture occurs at a point. This localized puncture causes an evaporation of the metal covering at the puncture point and thereby an insulation of this defective zone. The coil 16 preserves its insulation and the capacitance loss, due to the evaporation of the metallization at this point, is practically negligible. The plastic film is advantageously a polypropylene film metallized by a layer of zinc aluminum or an aluminum zinc alloy.

Figure 2:
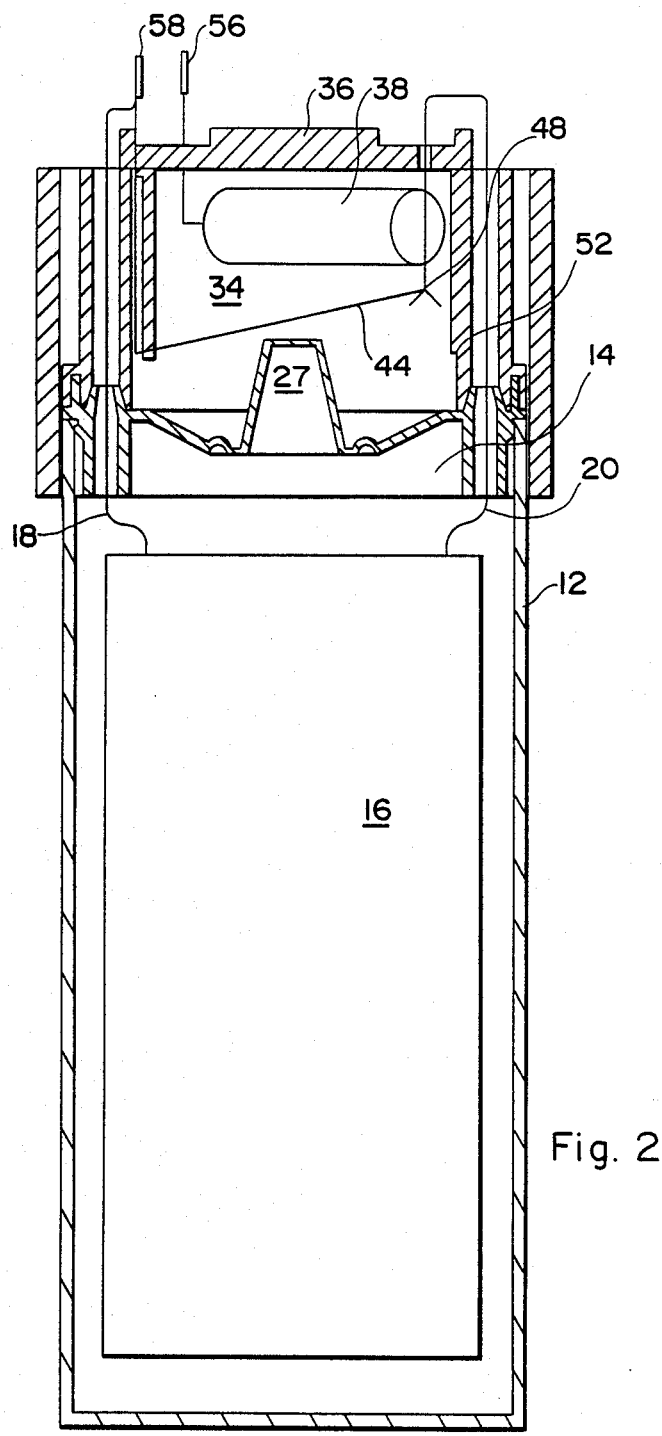
FIG. 2 is a similar view to that of FIG. 1, showing the cell when an internal overpressure occurs.
Figure 3:
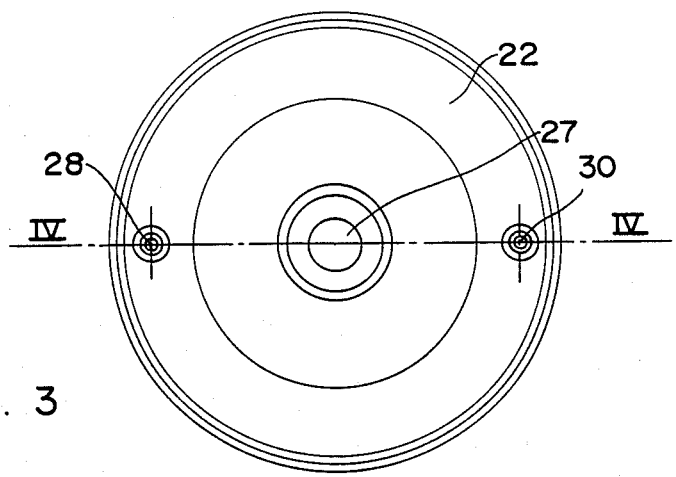
FIG. 3 is a plan view of the membrane of the cell according to FIG. 1.
Figure 4:
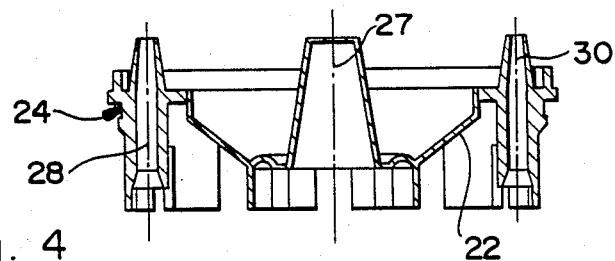
FIG. 4 is a cross-section along the line IV—IV of FIG. 3.
Figure 5:
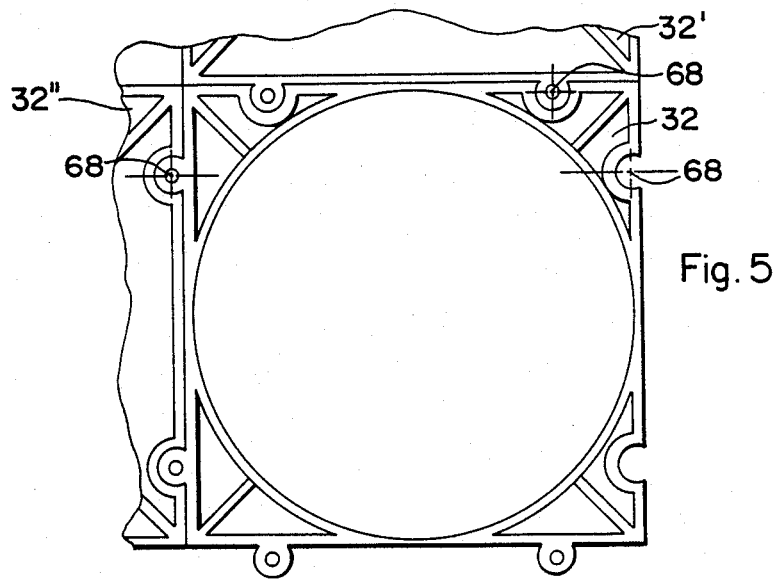
FIG. 5 is a plan view showing several cell covers assembled by clipping together.

After the coil 16 has been fitted, the casing 12 is capped by a membrane 22 represented in detail in FIGS. 3 and 4. The membrane 22 made of flexible plastic material has on its periphery a circular groove 24 clipping onto an edge 26 of the end of the casing 12. This clipping provides a provisional link between the membrane forming the cap and the casing 12. The central part of the membrane 22 bears a protrusion 27 and the peripheral part bushings 28, 30, respectively for the connecting conductors 18, 20 to pass through. A cover 32 made of rigid plastic material caps the membrane 22 fitting onto the external periphery of the open end 14 of the casing 12. The central part of the cover 32 is hollow to form a chamber 34 one of the ends of which is formed by the central part of the membrane 22 and the other end of which is sealed by a cover 36. Inside or outside the chamber 34 there is arranged a fuse 38 having connecting wires 40, 42, passing through the cover 36. In this chamber 34 there is also arranged a short-circuiting contact constituted by a flexible blade 44, one of the ends 46 of which is securely united to the cover 32, and thereby to the internal wall bounding the chamber 34. The flexible blade 44 constitutes the movable contact of the short-circuiting contact capable of cooperating with a stationary contact 48, supported by the fuse 38. The elasticity of the contact blade 44 urges the latter into contact with the stationary contact 48 in the manner shown in FIG. 2.

In the normal operating position, represented in FIG. 1, the free end 50 of the flexible blade 44 is retained by a nose 52 arranged in the wall of the chamber 34. The nose 52 maintains the elastic blade 44 in a straight position facing the protrusion 27 of the membrane 22 and separated from the stationary contact 48. One 56 of the connecting conductors of the cell 10 is connected to the conductor 40 of the fuse 38, whereas the other one 58 is connected both to the conductor 18 of the coil 16 and to a connecting conductor 54 to the elastic blade 44. The stationary contact 48 of the short-circuiter is connected to the conductor 42 of the fuse 38, itself connected to the conductor 20 of the coil 16. Referring to FIG. 1, it can easily be seen that the coil 16 and the fuse 38 are electrically connected in series, whereas the short-circuiting contact 44, 48 is open. In the closed position of the short-circuiting contact, represented in FIG. 2, the latter shunts the coil 16 being connected in series with the fuse 38. Closing of the short-circuiting contact 44, 48 causes a clean short-circuit, cleared by blowing of the fuse 38.

The cover 32 has two tubular orifices 60, 62 in alignment with the bushings 28, 30 of the membrane 22 for the conductors 28, 30 to pass through. The interfaces between the orifices 60, 62 and the bushings 28, 30, have conjugate cylindrical shapes enabling the conductors 18, 20 which pass through them to be fitted with a clamping and gripping effect. On the external periphery of the cover 32 there are arranged grooves 64 which extend up to the fitting zone of the cover 32 on the casing 12. These grooves 64 enable a polymerizable material to be cast, for example a polyurethane resin which secures the fitted casing 12, membrane 22 and cover 32 assembly by sticking. Casting a polymerizable material in the tubular orifices 60, 62 ensures the tightness of the bushings 28, 30. The inside of the casing 12 can be filled with a solidified resin if care is taken to arrange an annular clearance between the casing 12 and the coil 16 and solidified resin assembly, enabling the gases to escape to the membrane 22. In FIGS. 1 and 2, the polymerizable material which fills the orifices 60, 62, and the grooves 64 is not visible, but it can easily be understood that the casing 12 is sealed in a leaktight manner and that an internal overpressure causes outward deformation of the membrane 22, the protrusion 27 moving upwards engaging the elastic blade 44. The action of the protrusion 27 causes the elastic blade 44 to curve until its end 50 is disengaged from the nose 52 and, released, moves at high speed towards the stationary contact 48 to close the short-circuiting contact 44, 48.

The square-shaped cover 32 comprises on opposite sides clipping parts 68 of conjugate shape permitting assembly with covers 32', 32"of associated capacitor cells. This mode of assembly by clipping makes capacitors with several cells 10, connected in parallel series, easier to achieve.

Self-protection of the capacitor cell 10 is accomplished as follows :

in normal operation, represented in FIG. 1, the short-circuiting contact 44, 48, is open and the coil 16 is connected in series with the fuse 38. A localized puncture, due to a minor fault, is cleared by the self-healing effect resulting from the evaporation of the electrodes in the vicinity of the fault. When the self-healing capacities of the coil 16 are damaged, for example due to a large number of localized punctures or ageing of the cell, a large dielectric breakdown may occur, on abnormal stresses, causing a fault current. Protection is in this case achieved according to the type of fault, either directly by the fuse 38, blowing of which disconnects the cell 10, or by increased pressure in the casing 12 and deformation of the membrane 22, which actuates the short-circuiting contact 44, 48. Closing of this short-circuiting contact 44, 48 causes a clean short-circuit and thereby flowing of the fuse 38 entailing disconnection of the cell 10. This self-protection takes place in all cases before any notable deformation of the casing 12, preventing any external effects. The casing 12 can thus be made of plastic material and it is pointless to provide a metallic encasement housing the component parts which make up the capacitor. It is clear that the short-circuiting contact 44, 48 can be achieved in a different manner, for example by a latch holding the free end 50 of the elastic blade 44, which latch would be released by deformation of the membrane 22 by any suitable means. The elastic blade 44 can naturally be a movable contact with a high-speed actuating device well known to those specialized in the art. It is important that the short-circuiting contact be actuated by relatively weak forces and that the cell 10 be quickly de-energized by blowing of the fuse 38.

We claim:

1. A low voltage capacitor cell comprising :
    a self-healing wound coil
    a rigid external housing surrounding said coil, said housing having an open-ended casing and a deformable sealing membrane of said open end,
    a first compartment of said housing, confined in a leaktight manner by the casing and the deformale membrane and in which said coil is housed,
    a first and second connecting conductor of said wound coil, passing tightly through said membrane,
    a short-circuiting contact having a pair of stationary and movable contacts capable of being actuated when a deformation of said membrane occurs due to an overpressure generated in the first compartment, to bring about a clean short-circuit of said wound coil on closing,
    a cover covering said membrane,
    a second compartment confined by said cover and the deformable membrane, in which is housed the short-circuiter and a protective fuse arranged in said second compartment and inserted in series with one of said connecting conductors and said coil and said short-circuiting contact to disconnect said capacitor cell when an overpressure occurs causing the short-circuiting contact to close and when an overcurrent occurs flowing through said coil.

2. The capacitor cell according to claim 1, wherein said movable contact is elastically biased to the closed position, said short-circuiting contact comprising a latch retaining the movable contact in the open position, said membrane being arranged to release said movable contact from said latch, if an overpressure occurs in the first compartment, and to allow the short-circuiting contact to close.

3. The capacitor cell according to claim 2, wherein the movable contact is a flexible blade having one end cooperating with said latch formed by a fixed stop, said membrane cooperating with said blade if an overpressure occurs in the first compartment to bend the blade and release said end from the fixed stop.

4. The capacitor cell according to claim 1, wherein the casing and the cover are made of rigid plastic material and the membrane of flexible plastic material.

5. The capacitor cell according to claim 4, wherein the casing has the shape of an open-ended cylinder, said cover fitting on the open end of the cylinder.

6. The capacitor cell according to claim 1, wherein the tightness of the casing is achieved by casting polymerizable material, which sticks the parts opposite the cover, the membrane and the casing.

7. The capacitor cell according to claim 6, wherein a clearance is arranged between the internal wall of the casing and the coil for the gases generated in the cell to escape to the membrane.

8. The capacitor cell according to claim 1, wherein the casing is cylindrical in shape and is capped by a square-shaped cover, having conjugate assembly means of adjoining covers to form a capacitor with several assembled cells.

* * * * *